Jan. 3, 1956   J. W. JACOBS   2,729,720
REFRIGERATING APPARATUS
Filed March 22, 1952   4 Sheets-Sheet 1

INVENTOR.
James W. Jacobs
BY
Willits Hardman and Fehr
attorneys

Jan. 3, 1956

J. W. JACOBS 2,729,720

REFRIGERATING APPARATUS

Filed March 22, 1952

INVENTOR.
James W. Jacobs
BY
Willits Hardman and Fihe
Attorneys

Jan. 3, 1956   J. W. JACOBS   2,729,720
REFRIGERATING APPARATUS
Filed March 22, 1952   4 Sheets-Sheet 4

INVENTOR.
James W. Jacobs
BY
Willits Hardman and Fehr
Attorneys

United States Patent Office 2,729,720
Patented Jan. 3, 1956

2,729,720

REFRIGERATING APPARATUS

James W. Jacobs, Dayton, Ohio, assignor to General Motors Corporation, Dayton, Ohio, a corporation of Delaware Application March 22, 1952, Serial No. 278,077

6 Claims. (Cl. 200—140)

This invention is related in a general way to a refrigerating apparatus but more particularly relates to fluid pressure operated control devices such as may be used for controlling refrigerating apparatus and many other systems.

It is not generally realized that controls operated by fluid pressure are subject to changes in atmospheric pressure. In general, they have fluid pressure within their pressure responsive elements and at the same time on the outside they are subject to atmospheric pressure. Changes in atmospheric pressure, therefore, cause changes in the calibration of the control. In a pressure control this will change the points which the control operates in accordance with changes in atmospheric pressure. Where a volatile liquid is used to provide a pressure corresponding to a control temperature the amount of the change in calibration will depend on the temperature-pressure characteristics of the volatile liquid and the changes in atmospheric pressure.

For example, when difluorodichloroethane is used as the thermostatic volatile liquid in a control set to operate at minus 2° F. at an altitude of 800 feet, this control will have its operating point changed to plus 0.7° F. at sea level and at 5,000 feet altitude this control point will be lowered to minus 18.5° F. Even normal variations in the barometric pressure in any given locality will cause a variation of about plus or minus 1° F. in the calibration. A corresponding but less marked effect is characteristic of direct pressure operated controls.

It is an object of my invention to provide a control device in which the calibration does not change with changes in atmospheric pressure.

It is another object of my invention to provide a simple compensating arrangement for changes in barometric pressure for the pressure responsive element of a control device.

It is another object of my invention to provide a simple relatively inexpensive arrangement for combining a compensating diaphragm with an actuating diaphragm to provide an output directly responsive to the pressure applied to the actuating diaphragm.

These objects are attained by providing a diaphragm arrangement in which a rigid movable wall has sealed to one side a diaphragm having its central portion fastened to the structure of the control. The chamber thus formed by the wall and diaphragm may be connected through the fastening arrangement to a source of control pressure. The opposite face of the movable wall is provided with a second diaphragm enclosing a compensating chamber preferably containing a normally permanent gas such as hydrogen or helium and an extremely low absolute pressure such as a vacuum of 28½ to 29 inches of mercury. The output of this arrangement is taken from the movements of the movable wall which are transmitted through any conventional control operating mechanism to the control device proper such as a switch or valve. Any form of suitable snap-action mechanism may be included.

Further objects and advantages of the present invention will be apparent from the following description, reference being had to the accompanying drawings, wherein a preferred form of the present invention is clearly shown.

Figure 1:
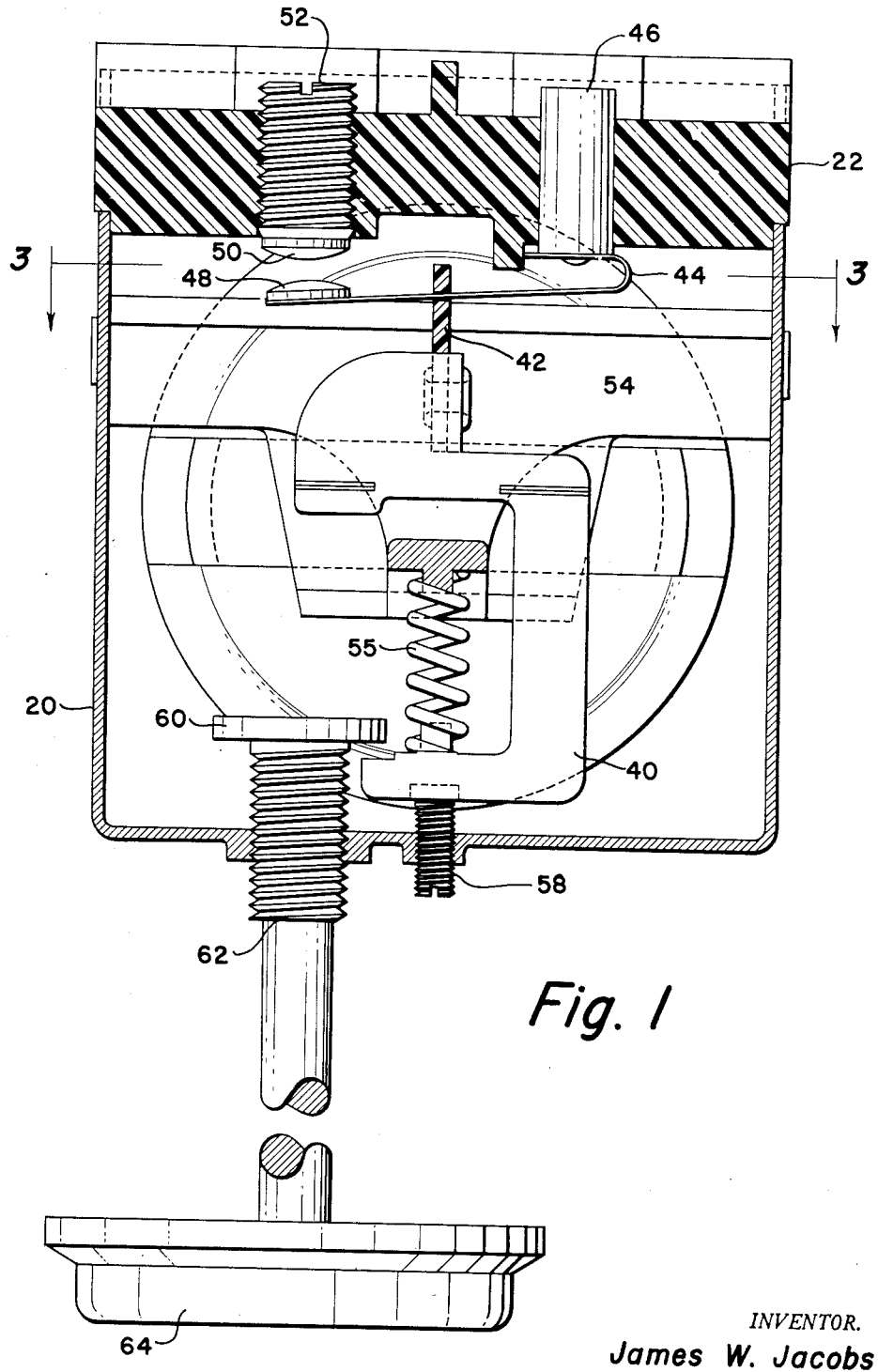
Figure 1 is a sectional view with some parts in elevation taken substantially along the line 1—1 of Figure 2 illustrating one form of my invention.
Figure 2:
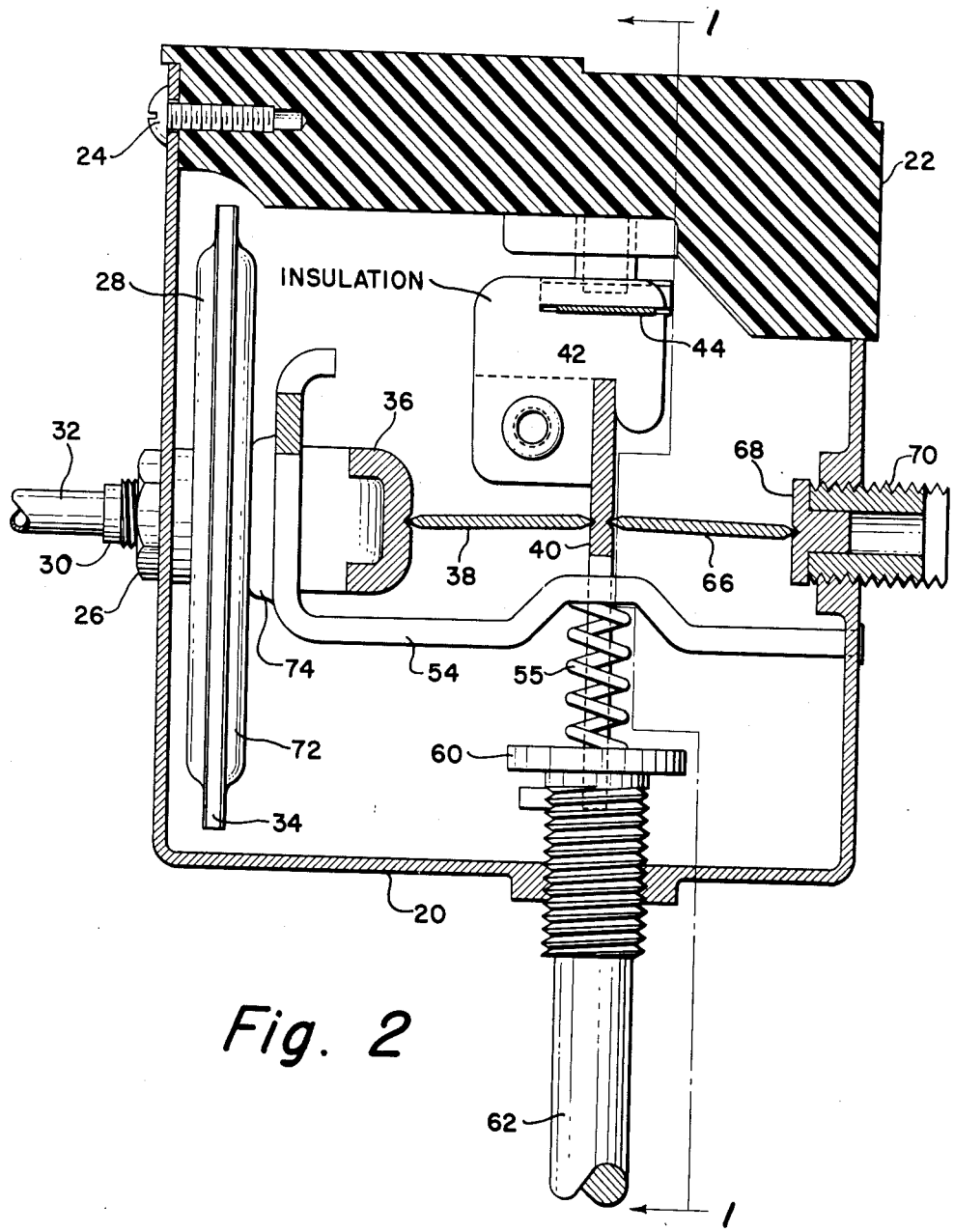
Figure 2 is a sectional view with some parts in elevation taken substantially along the line 2—2 of Figure 3.
Figure 3:
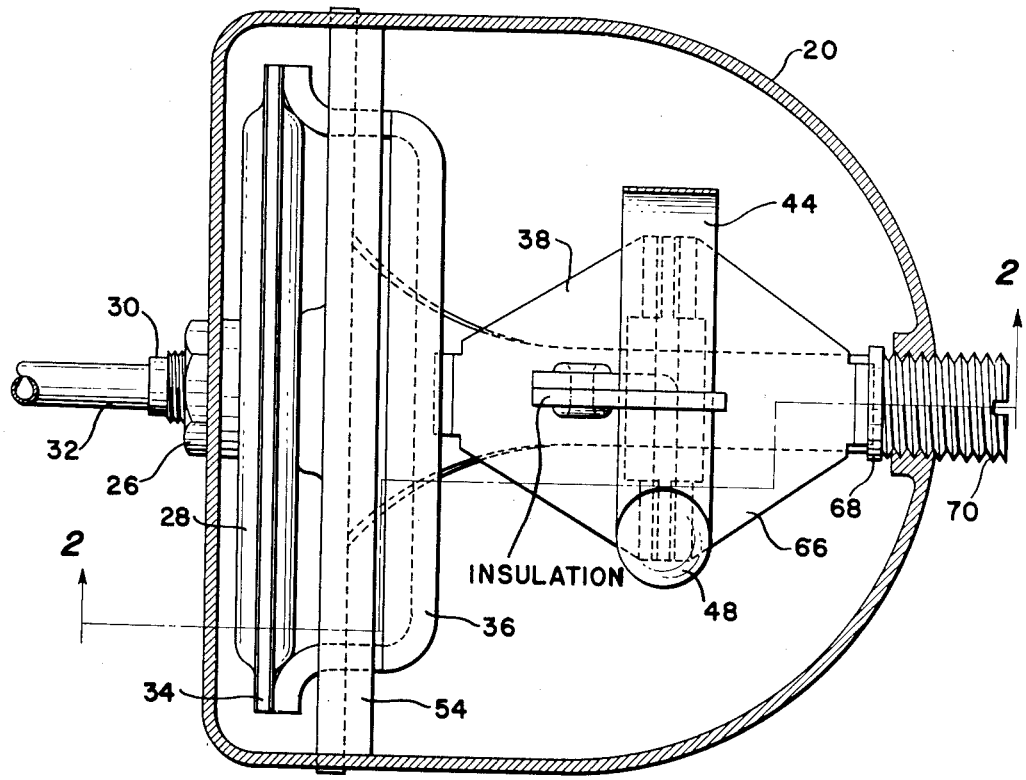
Figure 3 is a sectional view with some parts in elevation taken substantially along the line 3—3 of Figure 1.

Referring now to the drawings and more particularly to Figures 1, 2 and 3 there is shown a control including a metal casing 20 which encloses the moving parts and constitutes the main supporting structure of the control. Upon one side of the control there is provided an electrical insulating member 22 of a suitable thermoplastic fastened in place by a screw 24 to complete the enclosure of the mechanism. Fastened to one side of the casing 20 by the nut 26 is the central portion of a diaphragm 28. This nut 26 threads upon a sleeve 30 surrounding the tube 32 extending into the interior of the chamber formed by the diaphragm 28 and the flat rigid movable wall 34. The outer periphery of the diaphragm 28 is fastened and sealed to the edge portions of the movable wall 34.

The tube 32 is connected to a source of control pressure or to a thermostat bulb which creates pressure in accordance with surrounding temperatures. This causes changes in pressure in the diaphragm chamber formed between the diaphragm 28 and the movable wall 34. The changes in pressure in this chamber cause the movement of the movable wall toward and away from the adjacent portion of the metal casing 20. This movement of the wall 34 is transmitted through a yoke 36 by a notch and knife edge pivotal connection to the outer end of a toggle blade 38. The inner end of the toggle blade 38 is connected by a knife edge and notch pivotal arrangement to a follower member 40.

As one example of the invention I have chosen to show its application to a switch mechanism. Therefore, connected to the follower member 40 is a connecting member 42 of electrical insulating material having a notch which receives the mid-portion of a spring contact blade 44 having one end riveted to an electrical terminal 46 extending through the insulating member 22. The other end of the spring contact member 44 is provided with an electrical contact 48 adapted to make and break contact with the electrical contact 50 provided on the inner end of an adjustable terminal screw 52 likewise threaded through the insulating member 22.

A frame member 54 constitutes the principal part of a supporting structure within the metal casing 20. It is provided with a projection serving as the upper anchorage for a compression type coil spring 55. The follower member 40 is somewhat in the form of a reversed inverted letter G. The opposite end of the spring 55 is anchored to the lower projecting arm of the follower 40. The contact opening movement of the follower 40 is limited by an adjusting screw 58 threaded through a threaded opening in the casing 20 so that it is engaged by the adjacent portion of the follower member 40 at the extreme opening movement. This adjusting screw determines the temperature or pressure at which the switch contacts 48 and 50 are moved to the closed position.

The temperature at which the switch contacts 48 and 50 are moved to the open position is determined by the location of the flange 60 which is in the path of a projecting portion of the follower 40 and therefore limits the contact closing movement of the follower 40. This flange 60 is on the inner end of a long screw 62 threaded through the adjacent wall portion of the casing 20 and provided with a knob shaft and a suitable adjusting knob and indicator 64 for the purpose of providing a convenient contact opening adjustment.

The snap-action mechanism is completed by a second toggle blade 66 connected by a knife edge and notch pivotal connection with the follower 40 and by a similar pivotal connection with a button 68 rotatably mounted in the adjusting screw 70 threaded in the side of the casing 20 as shown in Figures 2 and 3. By suitable adjustment of the adjusting screw 70 a sufficient column loading can be applied to the toggle blade 38 and 66 to provide a satisfactory snap-action movement of the contacts 48 and 50 and the follower 40.

The structure so far described provides no compensation for changes in barometric pressure either by local changes or by changes due to a change in altitude. The change due to local barometric pressures is limited. The second possible change confronts a manufacturer of controls whose manufacturing plant for example may be located at an elevation of about 800 feet above sea level. If any of these controls are shipped to a mountain area where the altitude may be well over 5,000 feet, there will be an extensive change in the calibration of the control. There will also be a serious but less extensive change in the calibration of the control when it is shipped to areas where the altitude is near sea level. It is possible to recalibrate the control in the field to correct for the differences in altitude but often experienced and reliable personnel are not always available to perform the recalibration.

According to my invention I provide a second diaphragm having its outer periphery sealed to the movable wall 34 and having its central portion extending into contact with a central projecting portion 74 of the transverse portion of the frame member 54. This provides a second fluid chamber located between the diaphragm 72 and the movable wall 34. It is preferably charged with a gas which will remain in the gaseous state under all normal operating conditions, for example hydrogen or helium. However, to minimize the effect of temperature change which would cause a change in pressure in the gas, I prefer to evacuate this compensating chamber to a very high vacuum such as 28½ and 29 inches of mercury. This removes substantially all of the gas from this chamber so as to minimize the effect of temperature upon the gas remaining therein.

This second diaphragm 72 and the chamber formed thereby, therefore compensate for the effect of changes in atmospheric pressure upon the actuating diaphragm 28. That is, the force of the atmosphere upon the exposed portion of the diaphragm 28 will be compensated by an equal and opposite force acting upon the exposed surface of the diaphragm 72 which is equal in area to the diaphragm 28. Each of these diaphragms have their central portions held from movement by a portion of the supporting structure while their peripheral portions act under changes in barometric pressure exactly in the opposite direction upon the movable wall 34. Therefore, the effect of atmospheric pressure is eliminated as a factor in the operation and calibration of the control and the entire operation of the control is dependent upon the pressure in the chamber between the diaphragm 28 and the movable wall 34.

Figure 6:
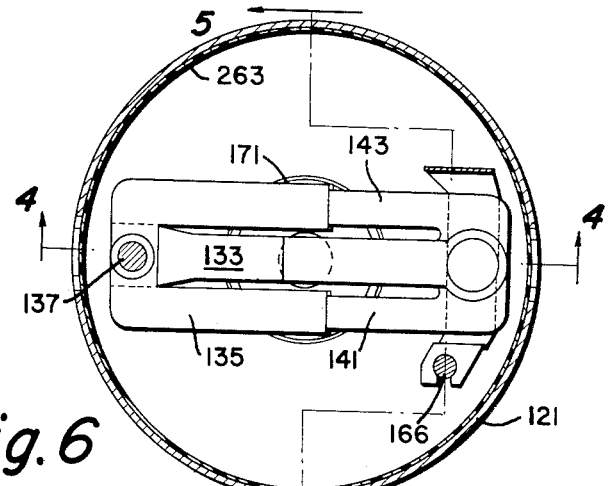
Figure 6 is a sectional view taken along the line 6—6 of Figure 4.
Figure 5:
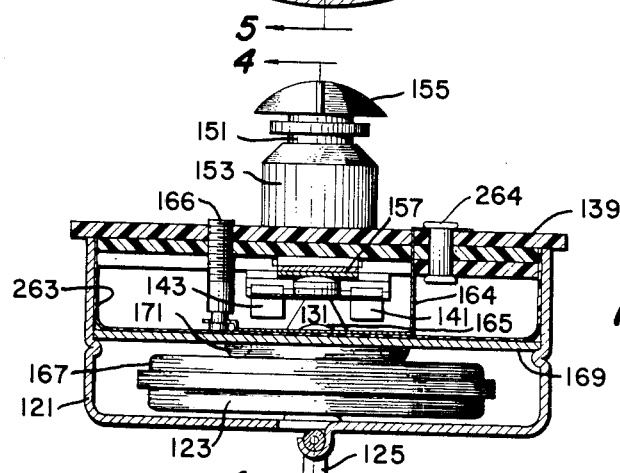
Figure 5 is a sectional view taken along the line 5—5 of Figure 4.
Figure 4:
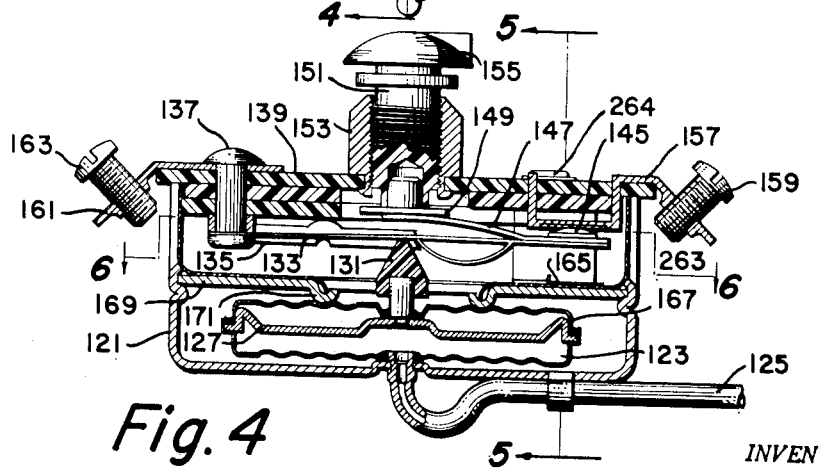
Figure 4 is a sectional view of another form of the invention taken along the line 4—4 of Figure 5.

In Figures 4 to 6, there is shown a second form of the invention which includes a metal casing 121 constituting the main structural part of the control. To the bottom of this casing 121 there is fastened the central portion of a metal diaphragm 123. This central portion 123 has its interior connected to a tube 125 through which pressure may be applied to the diaphragm 123 either by a thermostatic element or a pressure element. The rim of the diaphragm 123 is sealed to the periphery of the substantially rigid movable wall 127. The central portion of the movable wall 127 is connected to a pin over which there is provided a conical button 131 of plastic material. This conical button 131 bears against the center blade 133 of a blade type snap-section mechanism. This blade type snap-action mechanism includes a rigid U-shaped member 135, the central portion of which is riveted along with the blade 133 by the rivet 137 to the top wall 139 of the casing which is formed of three layers of a suitable thermoplastic material. The two ends of the U-shaped member 135 are provided with notches which receive the tongues 141 and 143 of the snap-action blade mechanism. These tongues 141 and 143 are integral with the center portion 133 that is compressed into a bowed condition as shown in Figures 4 and 5 by the relatively shorter length of the central portion 133 which is always kept under considerable tension.

At the junction of the tongues 141 and 143 with the central strip 133 there is riveted a movable contact 145 as well as one end of an arm 147, the other end of which bears upon a button 149 having a projection extending into a recess in the lower end of an adjusting screw 151 threaded into a bushing 153 in the top wall member 139. The screw 151 is provided with an indicating knob 155. The contact 145 cooperates with a combined stationary contact and terminal 157 which is in the form of a strip having a binding screw 159 on the outside and extending into the interior of the casing 121 to provide a suitable contact surface for engagement by the contact 145. The rivet 137 holds a second terminal 161 provided with a binding screw 163. The switch mechanism chamber is lined with a thin plastic cup 263.

A lowering of the pressure by the tube 125 will lower the pressure in the chamber between the diaphragm 123 and the movable wall 127 causing the movable wall 127 to move downwardly away from the contact mechanism so that the central portion 133 will follow the button 131 downwardly until it is moved across the dead center line of the tongues 141 and 143 so that the contact 145 will move to the open circuit position where the central strip portion 133 rests against the adjustable stop 165.

The adjustable stop 165 is in the form of a turned up projection on the inner edge of a leaf spring member 164 having one end fastened by the rivet 264 to the top wall 139. The other end of this leaf spring member 164 is provided with an offset which is connected to the lower end of the adjusting screw 166 threaded through the top wall 139. Turning of the adjusting screw 166 raises and lowers the stop 165 to adjust the switch closing temperature of the switch.

Upon an increase in pressure in the tube 125, the wall 127 will be moved upwardly to carry the central strip portion 133 upwardly across the dead center location until the contact 145 snaps to the closed position. The opening temperature or pressure of the switch is regulated by the adjustment of the knob 155 which adjusts the location of the button 149 and the contacting end portion of the arm 147. By this the opening force upon the contact 145 is varied to vary the opening pressure or temperature.

According to my invention, for the purpose of compensating for changes in barometric pressure due to any cause whatsoever I provide a second diaphragm 167 having both its peripheral portion and its central portion connected to the movable wall 127 as shown in Figure 4. To make this form of diaphragm 167 compensating for the effect of barometric pressure upon the diaphragm 123 there is provided a transverse support member 169 in the casing 121 having a central aperture through which projects the button 131. This central aperture has a downwardly turned flange 171 which contacts and holds substantially stationary that annular portion of the diaphragm midway between its central portion and its periphery. There is provided a second sealed chamber between the diaphragm 167 and the movable wall 127. This second sealed chamber is charged with a gas such as hydrogen or helium which remains in the gaseous state during normal conditions of operation. However, this gas is not under pressure but rather is under a high vacuum such as a vacuum of 28½ or 29 inches of mercury.

With this arrangement, the barometric pressure of the atmosphere will act substantially equally in opposite directions upon the external surfaces of the diaphragms 123 and 167 so that its net effect upon the movable wall 127 is substantially compensated for.

The diaphragm 167 is made of thinner material than the diaphragm 123 to compensate for the different supporting arrangement so that there is a substantially equal and opposite effect upon the movable wall 127 under changes in barometric pressure. The chamber between the diaphragm 123 and the movable wall 127 should be provided with a control pressure which will always remain above atmospheric pressure. This control pressure may be obtained either by the effect of temperature upon a volatile liquid such as tetrafluoro dichloro ethane or by a suitable source of pressure which is at all times higher than any atmospheric pressure expected to be encountered.

While I have shown my invention as applied to two forms of switch mechanisms, it may be readily applied in a similar way to other switch mechanisms and other control devices including various types of valves.

While the form of embodiment of the invention as herein disclosed constitutes a preferred form, it is to be understood that other forms might be adopted, as may come within the scope of the claims which follow.

What is claimed is as follows:

1. A control including a supporting structure, a control device supported by said supporting structure, a diaphragm having its central portion connected to and supported by said supporting structure, a movable substantially rigid wall connected to the peripheral portion of said diaphragm, transmitting means connecting that portion of said wall coaxially located relative to the central portion of said diaphragm with said control device, and a sealed diaphragm means having one portion operably connected to said wall and a second portion operably connected to said structure.

2. A control including a supporting structure, a control device supported by said supporting structure, a diaphragm having its central portion connected to and supported by said supporting structure, a movable substantially rigid wall connected to the peripheral portion of said diaphragm, transmitting means connecting that portion of said wall coaxially located relative to the central portion of said diaphragm with said control device, and a sealed diaphragm means having one portion operably connected to said wall and a second portion operably connected to said structure, said sealed diaphragm means providing a fluid chamber containing a gas at an extremely low absolute pressure which remains in the gaseous state throughout the normal operation of the control, and fluid pressure means for operating said diaphragm.

3. A control including a supporting structure, a control device supported by said supporting structure, a diaphragm having its central portion connected to and supported by said supporting structure, a movable substantially rigid wall connected to the peripheral portion of said diaphragm, transmitting means connecting that portion of said wall coaxially located relative to the central portion of said diaphragm with said control device, an annular diaphragm means having its inner portion and its outer peripheral portion sealed to said wall to form an annular fluid chamber, said structure being provided with means operably connected to an intermediate portion of said annular diaphragm means.

4. A control including a supporting structure, a control device supported by said supporting structure, a diaphragm having its central portion connected to and supported by said supporting structure, a movable substantially rigid wall connected to the peripheral portion of said diaphragm, transmitting means connecting that portion of said wall coaxially located relative to the central portion of said diaphragm with said control device, an annular diaphragm means having its inner portion and its outer peripheral portion sealed to said wall to form an annular fluid chamber, said structure being provided with means operably connected to an intermediate portion of said annular diaphragm means, said annular chamber containing a gas at an extremely low absolute pressure which remains in the gaseous state throughout the normal operation of the control, and fluid pressure means for operating said diaphragm.

5. A control including a supporting structure, a control device supported by said supporting structure, a diaphragm having its central portion connected to and supported by said supporting structure, a movable substantially rigid wall connected to the peripheral portion of said diaphragm, transmitting means connecting that portion of said wall coaxially located relative to the central portion of said diaphragm with said control device, an annular diaphragm means having its inner portion and its outer peripheral portion sealed to said wall to form an annular fluid chamber, said structure being provided with an annular rim surrounding said transmitting means and being substantially concentric with said annular diaphragm means, said rim extending in contact with said annular diaphragm means intermediate its central portion and its outer edge, said structure being provided with means for supporting said rim.

6. A control including a supporting structure, a control device supported by said supporting structure, a diaphragm having its central portion connected to and supported by said supporting structure, a movable substantially rigid wall connected to the peripheral portion of said diaphragm, transmitting means connecting that portion of said wall coaxially located relative to the central portion of said diaphragm with said control device, an annular diaphragm means having its inner portion and its outer peripheral portion sealed to said wall to form an annular fluid chamber, said structure being provided with a wall located between said annular diaphragm means and said control device, said wall having an aperture through which extends said transmitting means and a rim surrounding said aperture extending into contact with said annular diaphragm means.

References Cited in the file of this patent

UNITED STATES PATENTS

| | | |
|---|---|---|
| Re. 23,723 | Allwein | Oct. 13, 1953 |
| 766,820 | Fulton | Aug. 9, 1904 |
| 1,676,155 | Pfeifer | July 3, 1928 |
| 1,680,428 | Mottlau | Aug. 14, 1928 |
| 2,012,067 | Mayo | Aug. 20, 1935 |
| 2,536,198 | Matner et al. | Jan. 2, 1951 |
| 2,562,385 | Marcellus | July 31, 1951 |
| 2,639,352 | Watson | May 19, 1953 |

FOREIGN PATENTS

| | | |
|---|---|---|
| 93,524 | Germany | Aug. 24, 1897 |